United States Patent [19]

McGough

[11] 4,160,229
[45] Jul. 3, 1979

[54] CONCENTRIC TUBE HYDROPHONE STREAMER

[75] Inventor: Ronald B. McGough, Bellevue, Wash.

[73] Assignee: Honeywell Inc., Minneapolis, Minn.

[21] Appl. No.: 879,316

[22] Filed: Feb. 21, 1978

Related U.S. Application Data

[63] Continuation of Ser. No. 703,493, Jul. 8, 1976, abandoned.

[51] Int. Cl.$^2$ ............................................. G01V 1/38
[52] U.S. Cl. ...................................... 340/7 R; 340/8 S; 340/3 T
[58] Field of Search ................. 340/3 T, 7 R, 8 S, 10; 181/110, 402

[56] References Cited

U.S. PATENT DOCUMENTS

| | | | |
|---|---|---|---|
| 1,470,733 | 10/1923 | Hayes | 340/7 R |
| 2,465,696 | 3/1949 | Paslay | 340/7 R |
| 3,065,456 | 11/1962 | Alexander | 340/17 |
| 3,178,681 | 4/1965 | Horsman et al. | 340/10 |
| 3,299,397 | 1/1967 | Pavey et al. | 340/7 R |
| 3,371,311 | 2/1968 | Cholet et al. | 340/7 R |
| 3,437,171 | 4/1969 | Davis et al. | 340/7 R |
| 3,441,902 | 4/1959 | Savit | 340/7 R |
| 3,827,023 | 7/1974 | Henriquez et al. | 340/10 |
| 3,893,065 | 7/1975 | Lea et al. | 340/3 T |
| 3,930,254 | 12/1975 | Pavey | 340/3 T |
| 3,964,424 | 6/1976 | Hagemann | 340/3 T |

OTHER PUBLICATIONS

Sims, "An Improved Noise-Measuring Hydrophone, USRL Type H32", 10/18/60, USRL Research Report No. 52.
Chase, "Predicted Self Noise Characteristics of Towed Arrays with Concentric Hoses", 6/30/75, pp. 1-22, Bolt, Beranek and Newman Inc. Tech. Memorandum #234.

Primary Examiner—Nelson Moskowitz
Attorney, Agent, or Firm—Charles L. Rubow

[57] ABSTRACT

Hydrophone streamer apparatus embodying concentric tube construction for achieving improved low noise operation is disclosed. A plurality of hydrophone elements are supported within a compliant inner tube at spaced intervals therealong by compliant mounting means. The inner tube is supported within an elongated outer jacket by compliant support means between the outer surface of the inner tube and the inner surface of the jacket. Suitable support means may comprise a plurality of trilobate devices each formed of three tubular sections equally spaced around the inner tube, the trilobate devices being located along the inner tube at positions between adjacent transducer elements.

16 Claims, 6 Drawing Figures

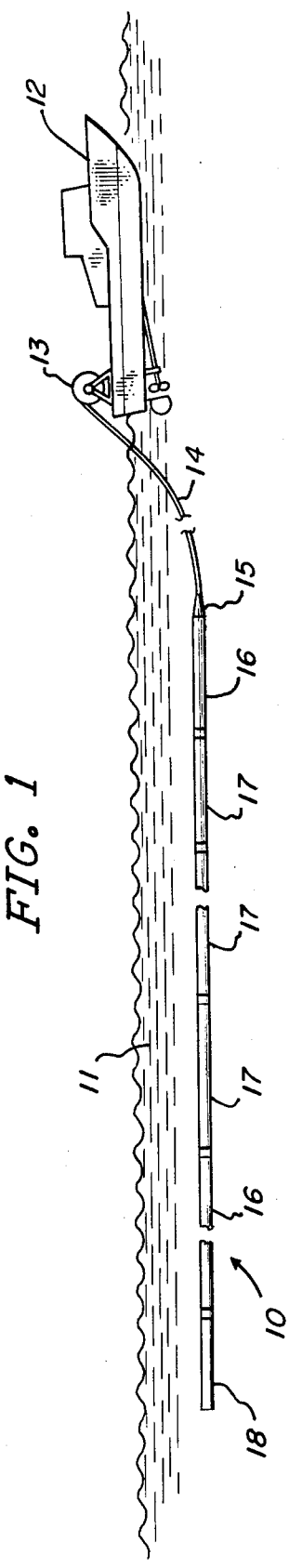
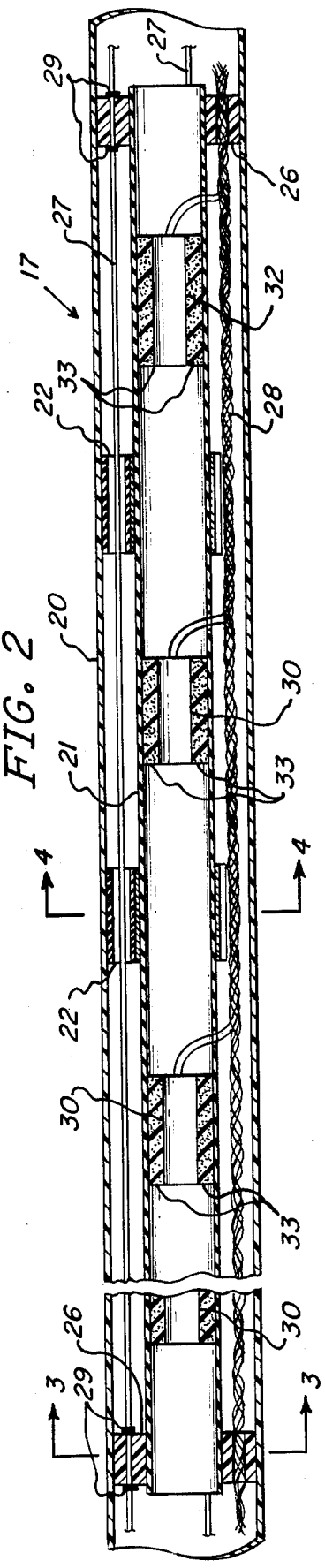
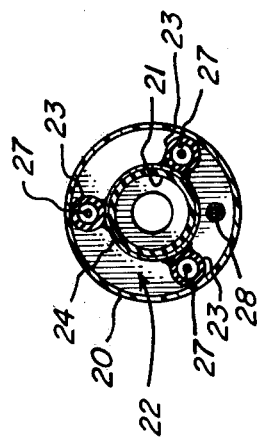
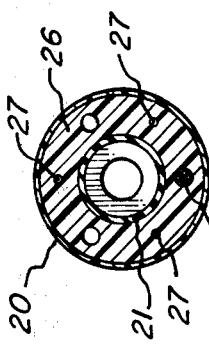

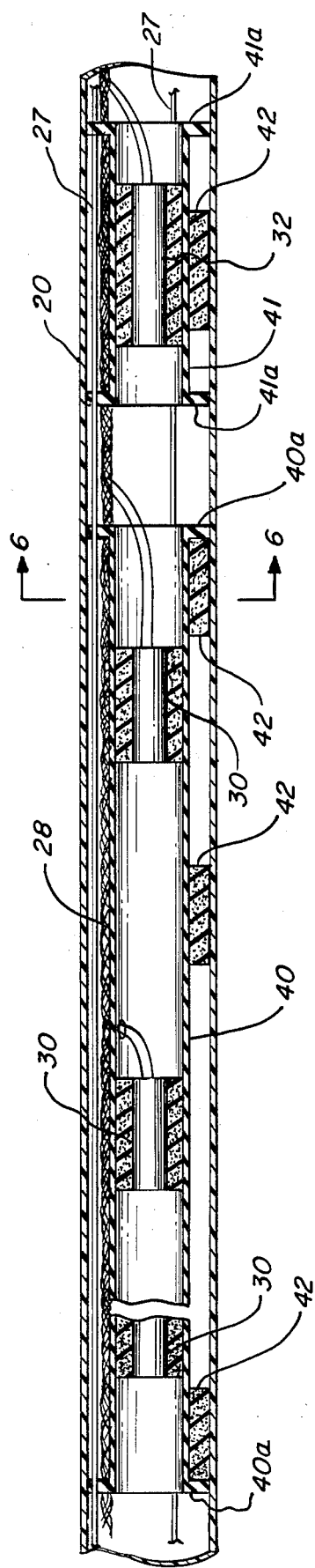
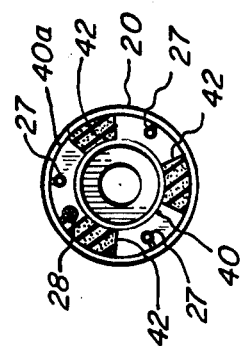

CONCENTRIC TUBE HYDROPHONE STREAMER

This is a continuation of application Ser. No. 703,493, filed July 8, 1976 now abandoned.

BACKGROUND OF THE INVENTION

The present invention relates generally to hydrophone apparatus for detecting pressure variations in the surrounding medium, and more specifically to improved high sensitivity hydrophone apparatus of the streamer type wherein sensing of pressure variations occurs along the length of an elongated member.

It is well known in the seismic detection and underwater sound sensing arts to employ a plurality of hydrophone elements positioned along an extended marine cable or streamer for achieving increased sensitivity and acoustic signal detection capability. Such streamers may be hundreds or thousands of feet long, and are typically operated in tow behind a marine vessel. Detection of signals throughout a volume of water is accomplished by towing a streamer along a predetermined path. Obvious advantages in the speed at which a marine survey can be made and in minimizing the cost of conducting such a survey accrue from increasing the towing speed.

A significant limiting factor on the effectiveness of a hydrophone streamer in detecting weak or distant signals is noise which may at least partially obscure or mask the signals. There are various contributing sources of noise, some of which are internal to the transducers and associated electrical and electronic components. Other significant sources of noise include: (1) vibrations of components within the streamer resulting from mechanically transmitted movements of the streamer and the restraining and/or towing lines, (2) direct transmission of pressure waves in fluid fill in the streamer induced by turbulent flow of water relative to the streamer, and (3) scattering of fluid fill velocities by interior streamer components. The level of noise originating from the last noted sources is generally directly related to the physical configuration of the streamer apparatus and the towing speed.

It is also advantageous to minimize the diameter of the streamer apparatus to reduce the handling problems of long streamers. However, the degree to which the size of a hydrophone streamer can be reduced is limited because reduction in size results in reduction in sensitivity. As size is reduced, a point is eventually reached where internal transducer and electronic noise exceed mechanically induced noise. Thus, there are practical limits on reductions in hydrophone streamer size.

A variety of means and techniques have been employed to reduce mechanically induced noise sensed by transducer elements in a hydrophone streamer. Noise resulting from turbulent flow relative to the streamer structure can be minimized by employing a smooth, streamlined outer configuration, and designing the streamer so as to minimize local and overall deviations of the longitudinal axis of the streamer from its direction of travel. Typical prior art techniques for minimizing deviations of streamer axis from direction of travel comprise achieving substantially neutral buoyancy by means of float members as shown in U.S. Pat. No. 3,696,329 issued to G. D. Hazelhurst on Oct. 3, 1972, or lighter than water fill materials as shown in U.S. Pat. Nos. 3,480,907 and 3,518,677 issued respectively to J. D. King on Nov. 25, 1969 and E. F. Florian on June 30, 1970, or combinations of air and heavier than water materials within the streamer as shown in U.S. Pat. No. 3,868,623 issued to F. R. Abbott on Feb. 25, 1975, or hydrodynamic depth control units as shown in U.S. Pat. No. 3,660,809 issued to R. H. Pearson on May 2, 1972.

A degree of isolation of the transducer elements from mechanically induced noise can be achieved by means of suitable filler materials surrounding the elements as shown in U.S. Pat. Nos. 3,480,907 and 3,518,677. In addition, a degree of isolation may be provided by hydrophone saddles, mounting tubes or cradles as shown in U.S. Pat. Nos. 3,518,677, 3,660,809 and 3,696,329 respectively. However, as performance requirements have become more demanding, it has become necessary to further reduce the noise levels due to the direct transmission of turbulent flow pressure waves and scattering of induced fluid fill velocities in hydrophone streamers, and to achieve more effective mechanical isolation of the transducer elements therein. In response to this requirement, the applicant has discovered and developed uniquely configured hydrophone streamer apparatus wherein substantially concentric tubular members are employed to achieve exceptionally sensitive and low noise performance.

SUMMARY OF THE INVENTION

The applicant's unique hydrophone streamer apparatus basically comprises a tubular member generally centrally located within an outer jacket of the streamer. Compliant support means are interposed between the inner surface of the jacket and the outer surface of the tubular member to maintain the tubular member in position, while isolating it from low frequency vibrations and accelerations in the jacket. A plurality of hydrophone transducer elements are supported at spaced intervals within the tubular member by compliant mounting means which isolate the transducer elements from the tubular member, and further isolate the transducer elements from the outer jacket.

The support means between the outer jacket and the tubular member may comprise a plurality of compliant tubes oriented generally parallel with the tubular member. Short sections of three such compliant tubes may be equally spaced around the tubular member in a trilobate cross-sectional configuration. Alternatively, the support means, as well as the mounting means for the transducer elements, may be formed of a compliant open cell foam material.

Accordingly, the primary object of this invention is to provide hydrophone streamer apparatus capable of exceptional sensitivity and low noise operation.

It is a further object of this invention to provide unique hydrophone streamer construction wherein two stages of mechanical isolation are provided between the streamer jacket and the hydrophone elements.

A further object is to provide a hydrophone streamer configuration wherein the amplitude of pressure waves scattered to the transducer elements from interior streamer components is significantly reduced.

A further object is to provide a hydrophone streamer employing concentric tube construction.

Yet a further object is to provide a hydrophone streamer of concentric tube construction wherein mechanical isolation between the inner and outer tubes is provided by compliant trilobate support means.

Additional objects of the invention may be ascertained from a study of the disclosure, drawings and appended claims.

BRIEF DESCRIPTION OF THE DRAWINGS

FIG. 1 is a pictorial view of a hydrophone streamer assembly in operating position behind a marine vessel;

FIG. 2 is a partial longitudinal cross-sectional view of a portion of one embodiment of a hydrophone streamer module in accordance with the present invention suitable for use in the hydrophone streamer assembly of FIG. 1;

FIG. 3 is a cross-sectional view of the hydrophone streamer module of FIG. 2 taken along lines 3—3;

FIG. 4 is a cross-sectional view of the hydrophone streamer module of FIG. 2 taken along lines 4—4;

FIG. 5 is a partial longitudinal cross-sectional view of an alternative embodiment of a hydrophone streamer module in accordance with the applicant's invention suitable for use in the hydrophone streamer assembly of FIG. 1; and FIG. 6 is a cross-sectional view of the hydrophone streamer module of FIG. 5 taken along lines 6—6.

DESCRIPTION OF THE PREFERRED EMBODIMENT

In FIG. 1, reference numeral 10 generally identifies a hydrophone streamer assembly in operating position under the surface of a body of water 11 in tow behind a marine vessel 12 equipped with a drum 13 on which the streamer assembly can be stored when desired. Streamer assembly 10 comprises a lead cable 14 which may include electrical signal conductors and other elements as well as a strain member or towing cable. Cable 14 is attached to the remainder of streamer assembly 10 through a fairing 15 which is followed by a first vibration isolation module 16. As shown, the first vibration isolation module is followed by hydrophone streamer modules 17 and an additional vibration isolation module. Streamer assembly 10 terminates in a drogue 18.

As shown in FIG. 2, each hydrophone streamer module 17 comprises an elongated hollow jacket 20 formed of a flexible material having suitable strength, abrasion resistant and chemical resistant properties. Vinyl, polyvinyl or urethane material has been found suitable for this application. Generally centered within jacket 20 is a compliant tubular member 21 having an outer diameter smaller than the inner diameter of jacket 20. Tubular member 21 may be formed of a suitable material, such as rubber. As also shown in FIG. 2, tubular member 21 may comprise a section of tubing, and need not extend the entire length of jacket 20.

Tubular member 21 is maintained generally centered within jacket 20 by compliant support means 22 positioned between the inner surface of the jacket and the outer surface of the tubular member. Support means 22 may be of any suitable configuration. However, as shown in FIGS. 2 and 4, one satisfactory arrangement comprises a plurality of support devices at generally equally spaced locations along tubular member 21. Each support device comprises three relatively short sections of compliant tubing 23 arranged so that their longitudinal axes are generally parallel with the longitudinal axis of tubular member 21, and equally spaced around member 21 in a trilobate cross-sectional configuration as seen in FIG. 4.

In the disclosed construction, tubing sections 23 are attached to the outer surface of a tubular central carrier 24 having an inner diameter equal to the outer diameter of tubular member 21. Tubing sections 23 are shown attached to member 24 by means of a suitable adhesive, although various other attachment means may be equally suitable. Tubing sections 23 and carrier 24 are formed of a compliant material such as Buna-N rubber so as to form a very soft or compliant support for tubular member 21.

A relatively rigid annular spacer 26 is located near each end of tubular member 21. Spacers 26 are positioned between the inner wall of jacket 20 and the outer wall of member 21, and have a plurality of apertures therethrough to accomodate strain members 27 and a bundle of twisted electrical conductors 28 as will hereinafter be described in greater detail. Polyethylene has been found to be a suitable material for spacers 26. Spacers 26 aid in transferring towing forces from the walls of jacket 20 to strain members 27 at distributed points along its length, and in maintaining the relative axial position of jacket 20 and member 21.

Strain members 27 typically comprise multistranded flexible cables which are relatively inelastic, and serve both to carry the principal towing forces of the streamer assembly and maintain longitudinal positioning of the various components therein. The location of spacers 26 on strain members 27 is shown fixed by means of collars 29 fixed to the strain members. Although collars are shown for this purpose, other suitable means may also be utilized for fixing the locations of spacers 26 on strain members 27.

Strain members such as those identified by reference numeral 27 have typically been formed of steel cable. However, recently a synthetic material produced by the B. F. Goodrich Company and designated as Kevlar, which approaches steel in strength and inelasticity, and has the additional advantage of light weight, has been successfully used. It is also pointed out that discrete strain members as shown in FIGS. 2-4 are not the only suitable means for providing longitudinal strength and stiffness. This function can also be achieved by means of reenforcing cables or cords molded into jacket 20.

A plurality of hydrophone transducer elements 30 are carried within tubular member 21 at spaced intervals therealong. Elements 30 may be of any suitable type, and may, for example, comprise radially polarized piezoelectric cylinders with suitable electrodes on their inner and outer surfaces. Alternatively, annular piezoelectric elements with slightly concave or convex diaphragms fixed to opposite ends thereof, and the combination suitably mounted in a can or fixture may also be employed.

Electrical signals are carried from or to the piezoelectric elements by means of elctrical conductors attached to the electrodes. The conductors pass through apertures in tubular member 21 into conductor bundle 28 which extends along the space between jacket 20 and tubular member 21. Typically a plurality of transducer elements 30 are connected to electronic circuitry comprising a signal transmitting module, receiver and/or signal processing apparatus which serves to combine signals from the transducer elements as desired. In FIG. 2, at least a portion of this electronic circuitry is identified by reference numeral 32 and is mounted within tubular member 21 in a manner similar to transducer elements 30. Alternatively, electronic circuitry 32 may be located in a second tubular member similar to tubular member 21, or may be located elsewhere and mounted in some other suitable manner. Several tubular members 21 with associated hydrophone transducer elements and electronic circuitry modules may be spaced at intervals along the length of the streamer to form a multiplicity of hydrophone groups for the purpose of increasing directional sensitivity.

Transducer elements 30 and electronic circuitry 32 are shown supported within tubular member 21 by compliant mounting means 33. An open cell or saturable foam material may be used for mounting means 33, which may be in the form of a plurality of strips of such foam material arranged around the transducer elements and/or electronic circuitry between the peripheries thereof and the inner surface of tubular member 21. A variety of compliant open cell foam materials are suitable for this purpose. However, the open cell property is important in the disclosed type of hydrophone streamer module wherein it is desired to substantially eliminate all voids and/or air pockets as jacket 20 is filled or flooded with a suitable substance having good acoustic signal transmission characteristics. A mixture of transformer oil such as General Electric 10C oil and Isopar M have been found suitable for filling the streamer module. Alternatively, kerosene or other substances which can be used in a liquid state to fill the streamer module are also suitable. Obviously, the fill substance and the various other materials in the streamer module must be chosen to be chemically compatible with one another.

As is apparent from FIGS. 2–4 and the preceeding discussion thereof, tubular member 21, compliant support means 22 and compliant mounting means 33 effect two stage isolation of transducer elements 30 from jacket 20. This arrangement has been found exceptionally effective in isolating elements 30 from accelerations and vibrations induced in jacket 20, and in reducing fluid fill pressure waves and scattering due to turbulence and mechanical noise. Furthermore, the use of a circumferentially compliant jacket with the described inner tubular member and support means has the potential of significantly reducing the noise amplitude at the transducer elements due to scattering from interior components, and also reducing the amplitude of turbulent flow induced pressure waves transmitted directly to the transducer elements as compared to noise amplitudes measured in other streamer configurations. As a result, heretofore unachievable high sensitivity and low noise operation has been realized.

An alternative embodiment of a hydrophone streamer module particularly suitable where small outer diameter is important is shown in FIGS. 5 and 6. Various components of this embodiment are essentially identical to components in the embodiment of FIGS. 2–4. Such components will be designated with the same reference numerals in all figures. Accordingly, the embodiment of FIGS. 5 and 6 comprises an elongated hollow jacket 20, a plurality of strain members 27, a bundle of twisted electrical conductors 28, a plurality of transducer elements 30, electronic circuitry 32 and mounting means 33 for supporting the transducer elements and electronic circuitry within an inner tubular member. These components cooperate in the same manner as previously described in connection with FIGS. 2–4. Reference may be made to the preceeding description for further understanding of common aspects of the structure and operation of the two embodiments.

The embodiment of FIGS. 5 and 6 differs from the embodiment of FIGS. 2–4 principally in the configuration of the inner tubular member and the support means for maintaining the position of the inner tubular member within jacket 20. In the embodiment of FIGS. 5 and 6, a first tubular member 40 carries transducer elements 30 and a second tubular member 41 carries electronic circuitry 32. Tubular members 40 and 41 are formed with radial flanges 40a and 41a at the ends thereof. The outer diameter of flanges 40a and 41a is equal to the inner diameter of jacket 20. A plurality of slits or apertures are formed in flanges 40a and 41a to accomodate strain members 27 and conductor bundle 28. At least the slits which accomodate strain members 27 are sized to provide an interference fit with the strain members so as to aid in maintaining proper position of tubular members 40 and 41 along the strain members, and to aid in transferring towing forces from the strain members to remaining portions of the streamer module.

Reference numeral 42 identifies compliant support means for maintaining tubular members 40 and 41 in a generally central position within jacket 20. Support means 42 comprises a plurality of support devices formed of an open cell or saturable foam material. As illustrated in FIG. 6, each support device includes three strips of foam material substantially equally spaced around tubular member 40. However, other configurations and/or arrangements are also suitable.

As described in connection with the embodiment of FIGS. 2–4, the embodiment of FIGS. 5 and 6 also provides two stage isolation of transducer elements 30 from jacket 20, thereby effectively isolating the transducer elements from vibrations and accelerations in the jacket. Thus, superior sensitivity and low noise performance is achieved.

Although two embodiments of the applicant's unique hydrophone streamer module employing concentric tube construction have been shown and described for illustrative purposes, other embodiments which do not depart from the applicant's contemplation and teaching will be apparent to those skilled in the art. The applicant does not intend that coverage be limited to the disclosed embodiment but only by the terms of the appended claims.

The embodiments of the invention in which an exclusive property or right is claimed are defined as follows:

1. In hydrophone streamer apparatus having an elongated hollow jacket with means at one end for connection to a marine vessel, and along which are located spaced hydrophone transducer elements for producing electrical signals indicative of pressure variations in the medium surrounding the streamer, improved mechanical isolation means for effecting two stages of isolation between the transducer elements and the jacket comprising:

a complaint tubular member positioned within the jacket and having an outer diameter smaller than the inner diameter of the jacket;

a plurality of compliant support devices between the inner surface of the jacket and the outer surface of said tubular member at spaced locations therealong for maintaining said tubular member in a generally central position within the jacket, each support device comprising at least three separated elements spaced around said tubular member; and compliant mounting means for supporting a plurality of spaced transducer elements within said tubular member so that individual transducer elements are located between adjacent support devices.

2. The hydrophone streamer apparatus of claim 1 wherein each compliant support device comprises a plurality of compliant tubes arranged around said tubular member so that their longitudinal axes are generally parallel with the longitudinal axis of said tubular member.

3. The hydrophone streamer apparatus of claim 2 wherein said plurality of compliant tubes are equally spaced around said tubular member in a trilobate cross-sectional configuration.

4. The hydrophone streamer apparatus of claim 3 wherein said compliant tubes are formed of a relatively soft rubber material.

5. The hydrophone streamer apparatus of claim 4 wherein said compliant mounting means is formed of an open cell foam material.

6. The hydrophone streamer apparatus of claim 5 wherein said compliant mounting means for each transducer element comprises a plurality of strips of open cell foam material equally spaced around the transducer element.

7. The hydrophone streamer apparatus of claim 1 wherein each compliant support device is formed of an open cell foam material.

8. The hydrophone streamer apparatus of claim 7 wherein each compliant support device comprises strips of open cell foam material equally spaced around said tubular member.

9. The hydrophone streamer apparatus of claim 8 wherein said compliant mounting means for each transducer element comprises strips of open cell foam material spaced around the transducer element.

10. Hydrophone streamer apparatus for producing electrical signals indicative of pressure variations in the surrounding medium comprising, in combination:
- an elongated hollow jacket;
- a compliant tubular member having an outer diameter smaller than the inner diameter of said elongated hollow jacket, said tubular member being positioned within said jacket;
- a plurality of compliant support devices between the inner surface of said jacket and the outer surface of said tubular member at spaced locations therealong for maintaining said tubular member in a general central position within said jacket, each support device comprising at least three separated elements spaced around said tubular member;
- a plurality of hydrophone transducer elements; and
- compliant mounting means for supporting said transducer elements at spaced positions within said tubular member so that individual transducer elements are located between adjacent support devices.

11. The hydrophone streamer apparatus of claim 10 wherein each compliant support device comprises a plurality of compliant tubes arranged around said tubular member so that the longitudinal axes thereof are generally parallel with the longitudinal axis of said tubular member.

12. The hydrophone streamer apparatus of claim 11 wherein said compliant support means comprises three compliant tubes substantially equally spaced around said tubular member in a trilobate cross-sectional configuration.

13. The hydrophone streamer apparatus of claim 12 wherein said compliant support means comprises short sections of compliant tubes located around said tubular member at locations generally midway between adjacent transducer elements.

14. The hydrophone streamer apparatus of claim 13 including:
- a plurality of compliant tubular members axially spaced within said hollow jacket, each of said tubular members being shorter in length than said jacket;
- a spacer positioned around each said tubular member at each end thereof; and
- strain member means extending substantially the length of said hollow jacket fixed to said spacers so as to prevent relative longitudinal movement between said strain member means and said spacers.

15. The hydrophone streamer apparatus of claim 14 wherein said strain member means comprises a plurality of Kevlar cables.

16. The hydrophone streamer apparatus of claim 14 wherein electrical conductors for transmitting electrical signals between said transducer elements and utilization circuitry pass through the space between said hollow jacket and said tubular member.

* * * * *